(12) United States Patent  
Koch

(10) Patent No.: US 7,587,039 B1  
(45) Date of Patent: Sep. 8, 2009

(54) METHOD, SYSTEM AND STORAGE MEDIUM FOR PROVIDING AUTOMATED CALL ACKNOWLEDGEMENT SERVICES

(75) Inventor: Robert Koch, Nocross, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 1117 days.

(21) Appl. No.: 10/666,512

(22) Filed: Sep. 18, 2003

(51) Int. Cl.
*H04M 3/42* (2006.01)

(52) U.S. Cl. ............... 379/211.01; 379/211.02; 379/212.01

(58) Field of Classification Search ............ 379/211.01, 379/88.13, 93.23, 142.01, 142.15, 211.02, 379/210.01, 212.01
See application file for complete search history.

(56) References Cited

U.S. PATENT DOCUMENTS

| | | | |
|---|---|---|---|
| 4,197,526 A | | 4/1980 | Levine et al. |
| 5,327,486 A | * | 7/1994 | Wolff et al. .............. 379/93.23 |
| 5,563,938 A | | 10/1996 | Soshea et al. |
| 5,742,905 A | * | 4/1998 | Pepe et al. ................. 455/461 |
| 5,898,668 A | | 4/1999 | Shaffer |
| 6,018,671 A | * | 1/2000 | Bremer ....................... 455/567 |
| 6,347,085 B2 | | 2/2002 | Kelly |
| 6,347,225 B1 | * | 2/2002 | Nishiyama ............... 455/412.1 |
| 6,363,065 B1 | | 3/2002 | Thornton et al. |
| 6,389,005 B1 | | 5/2002 | Cruickshank |
| 6,404,860 B1 | * | 6/2002 | Casellini .................. 379/88.17 |
| 6,510,219 B1 | | 1/2003 | Wellard et al. |
| 6,724,872 B1 | * | 4/2004 | Moore et al. ............. 379/93.35 |
| 6,741,678 B2 | * | 5/2004 | Cannell et al. ........... 379/88.14 |
| 7,224,774 B1 | * | 5/2007 | Brown et al. ............. 379/88.14 |
| 7,305,075 B2 | * | 12/2007 | Harris ................... 379/142.01 |
| 2004/0018830 A1 | | 1/2004 | Pugliese |
| 2005/0226398 A1 | | 10/2005 | Bojeun |

* cited by examiner

*Primary Examiner*—William J Deane  
(74) *Attorney, Agent, or Firm*—Cantor Colburn LLP

(57) ABSTRACT

Embodiments of the invention relate to a method, system, and storage medium for providing automated call acknowledgement services over a network. The method includes receiving a data request from a call-receiving device to acknowledge an incoming call from a calling device. The data request includes a phone number for the call-receiving device, a phone number or text address for the calling device, a message type, and a voice/text indicator selection. The method further includes retrieving a pre-defined acknowledgement message from a database based upon the message type and sending the pre-defined acknowledgement message to the calling device in lieu of answering the incoming call.

21 Claims, 3 Drawing Sheets

METHOD, SYSTEM AND STORAGE MEDIUM FOR PROVIDING AUTOMATED CALL ACKNOWLEDGEMENT SERVICES

BACKGROUND OF THE INVENTION

The present invention relates generally to voice and digital communications services, and more particularly, the invention relates to a method, system, and storage medium for providing automated call acknowledgement services over a communications network.

The growing popularity of the Internet and the associated Internet protocol (IP) technology has carried over to the cellular industry which has embraced IP as the networking architecture of choice for creating and implementing new applications and service offerings. Recent trends toward open, packet-based wireless technology has facilitated an extraordinary expansion of global, wireless subscribers which continues to grow each year.

This third-generation (3G) technology provides network operators and third-party content and service providers with vast potential for delivering new services and value-added content to mobile cellular subscribers that can be personalized in ways never before thought possible.

While the increase in mobile communications has provided great flexibility and convenience for the subscriber, it has also created the need for improvements. For example, a subscriber of mobile services often finds that calls come through at inopportune moments, such as while driving in a car, sitting in a meeting, or while the subscriber is otherwise occupied. The increase in traffic accidents by drivers distracted while talking on cell phones and the recent legislation restricting cell phone usage on the road is evidence of the need for additional service options for the mobile device user.

In most situations, the called party has two choices: answer the call or allow the call to go unanswered. There are circumstances that arise, however, whereby the caller is not able to answer the call and has no other option but to let the call pass. With caller identification service, the called party may be aware of who is placing the call but has no way of acknowledging the call or the caller without physically answering the call.

What is needed, therefore, is a convenient way to acknowledge to a caller that the called party is aware of the call and to communicate information as to how or when the two parties may communicate at a future time without physically answering the call.

SUMMARY OF THE INVENTION

Embodiments of the invention relate to a method, system, and storage medium for providing automated call acknowledgement services over a communications network. The method includes receiving a data request from a call-receiving device to acknowledge an incoming call from a calling device. The data request includes a phone number for the call-receiving device, a phone number or text address for the calling device, a message type, and a voice/text indicator selection. The method further includes retrieving a pre-defined acknowledgement message from a database based upon the message type and sending the pre-defined acknowledgement message to the calling device in lieu of answering the incoming call.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

Existing communications systems allow called parties two choices; that is, either to answer or not answer an incoming call. The automated call acknowledgement service of the invention provides a third option to a called party, allowing them to acknowledge an incoming call, and optionally, to provide instructions as to how the two parties may communicate at a future time. Acknowledgement messages may include general "boilerplate" statements or may include customized, pre-defined statements defined by the called party. Acknowledgement messages can be text or voice-based statements depending upon the type of communications devices utilized by the parties placing the calls.

Figure 1:
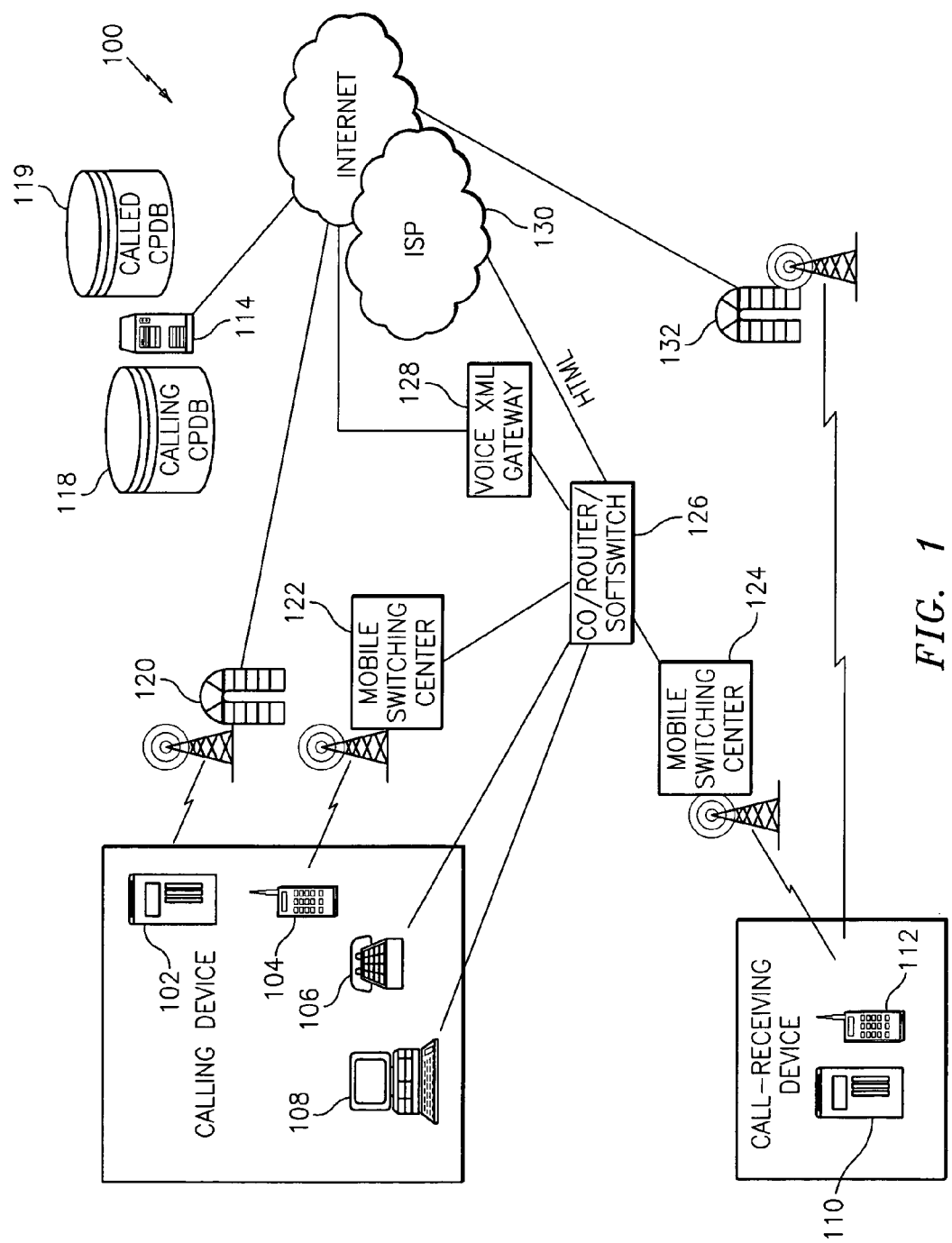
FIG. 1 is a block diagram of a system upon which the automated call acknowledgement service is implemented in an exemplary embodiment.

The automated call acknowledgement service is executed via a communications network as shown in the system 100 of FIG. 1. FIG. 1 depicts a variety of communications devices for which the automated call acknowledgement service may be applied. A calling party places a call using a calling device such as one of calling devices 102-108. Calling devices shown in FIG. 1 include a pager 102, a cell phone 104, wireline telephone 106, and a personal computer 108. It will be understood that other types of calling devices may also be utilized in order to realize the benefits of the invention.

Pager 102 communicates with other mobile devices using radio waves to transmit messages over a wireless data gateway. Pager 102 may be an alphanumeric pager that delivers text messages to the call-receiving device, rather than simple numeric phone numbers, or may be a two-way pager.

Cell phone 104 communicates via cell tower and mobile switching center 122, which, in turn, communicates to other networks via a central office 126. Central office 126 includes a router and softswitch. These capabilities of central office 126 further allow wireline telephone 106 and personal computer 108 to communicate with mobile devices over wired and wireless networks.

Private Branch Exchange (PBX) wireline telephone 106 refers to a traditional wired telephone utilizing Public Switched Telephone Network (PSTN) which carries analog voice data.

Personal computer 108 may comprise a desktop, laptop, or other similar general-purpose computing device.

A called party who is the recipient of a call may receive the call on any one of call-receiving devices 110-112.

Server 114 executes the automated call acknowledgement service and comprises any suitable high-speed microprocessor capable of handling the volume of activities provided by the features and functions of the automated call acknowledgement service and its subscriber base. Server 114 is accessible to the Internet and includes a security feature or firewall (not shown) in order to protect the integrity of the data stored therein.

The automated call acknowledgement service may be executed by a third party network provider or application service provider (ASP) and a portion of the automated call acknowledgement service may be resident in memory on a subscriber's call-receiving device as described further herein.

Figure 4:
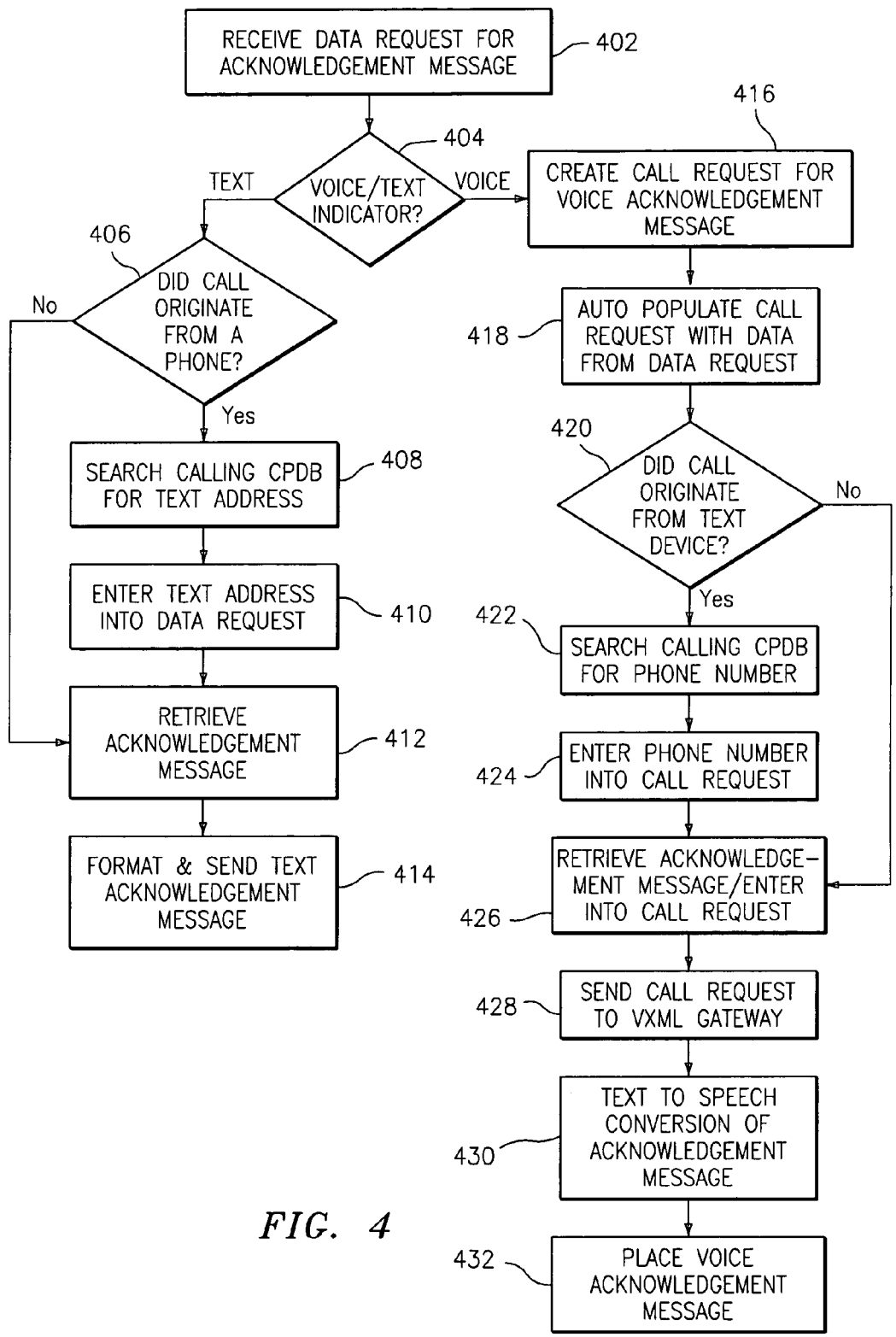
FIG. 4 is a flowchart describing the process of implementing the features of the automated call acknowledgement service in an exemplary embodiment.

Calling customer profile database 118 stores phone numbers and text addresses for calling parties that are mapped for accessing and retrieving this information as described in FIG. 4.

Called customer profile database 119 stores customer profile data for subscribers of the automated call acknowledgement service. Customer profile data includes personal information, phone numbers, text addresses, etc. Called customer profile database 119 also stores texts of acknowledge messages defined by the subscriber, the automated call acknowledgement service, or a combination of both.

Wireless data gateways 120, 132 allows mobile digital devices to access the Internet and communicate with other wireless devices. Wireless data gateways 120, 132 route the data back and forth between mobile digital devices such as a laptop 108 or pager 102.

Mobile switching centers (MSC) 122, 124 are circuit-switching platforms that provide an interface for mobile devices to connect with a central office 126 and direct the network traffic coming in and leaving the MSC. MSCs 122, 124 serve as a network node in the wireless telecommunications network of system 100 as well as a point of access to a Public Switched Telephone Network (PSTN). A router at central office 126 forwards the data packets received from mobile communications devices on to other networks and determines the optimal routes for these packets.

A softswitch, or software-switching platform, at central office 126 is an application programming interface that links disparate forms of communications. The softswitch bridges PSTN and Voice-over IP data received at central office 126.

VoiceXML Gateway 128 is similar to the wireless data gateways 120 and 132 except gateway 128 utilizes VoiceXML, or Voice Extensible Markup Language technology for enabling calling and call-receiving devices to access the Internet via a text-to-speech and/or voice-recognition component. The party on the calling device (telephone) hears an acknowledgement message in the form of computer-generated audio output while the call-receiving party may generate an acknowledgement message utilizing a voice-recognition component. These technologies are well known and will be understood by those skilled in the art.

ISP 130 represents an Internet Service Provider that provides access to the Internet for mobile digital devices such as laptop 108 or a handheld device under a subscription agreement, usually in the form of a monthly fee.

Figure 2:
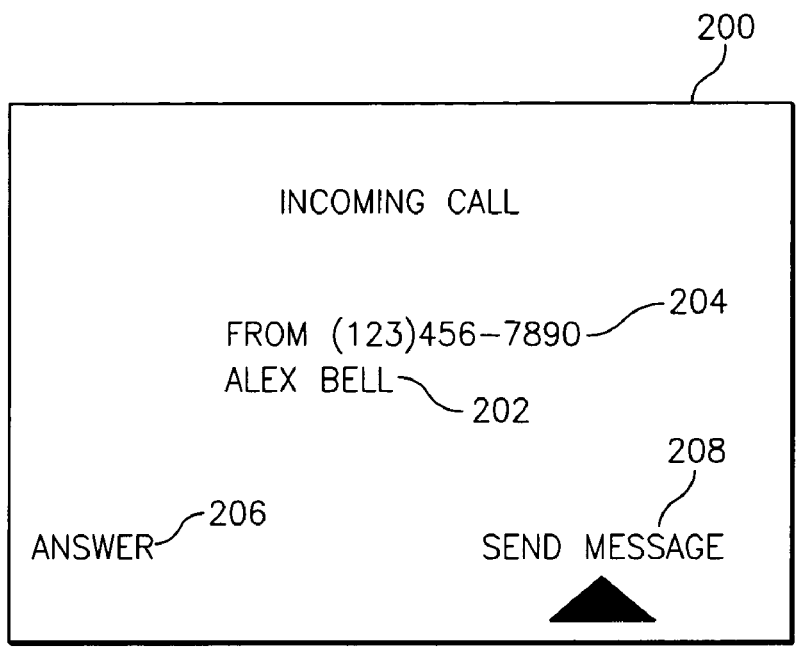
FIG. 2 is a sample screen display on a call-receiving device that is implementing the automated call acknowledgement service, indicating an incoming call has been detected in an exemplary embodiment.

The automated call acknowledgement service can be implemented in a variety of communications environments. A caller may place a call using any means including wireless, wireline, PDA, desktop, and the call is routed to the call-receiving device mobile switching center 124 using standard communications channels. Mobile switching center 124 is on the edge of the network between the network and the call-receiving device 110, 112. Upon receiving an incoming call, a screen display such as display 200 as shown in FIG. 2 is presented on the call-receiving device 110, 112. It will be understood that the terms, called party and call-receiving party, are used interchangeably throughout this description.

FIG. 2 illustrates a sample screen display 200 on a call-receiving device 110, 112 upon detecting an incoming call. It is assumed that the call-receiving device's network subscription includes a caller identification service. The identity of the calling party 202 and the number of the calling party 204 is displayed on call-receiving device 110, 112 via the caller identification service. Two options are displayed on screen display 200. Answer 206 and send message 208. In situations where the called party is unable or unwilling to answer the call, the send message 208 option allows the called party to acknowledge the call without connecting with the calling party. If the called party ignores the call, i.e., takes no action, the call proceeds to a voicemail system of the call-receiving party. Likewise, if the called party selects the send message 208 option, the call may proceed to a voicemail system even though the called party responds with an acknowledgement message. This is described further in FIG. 4. Upon selecting the send message option 208, a data request for an acknowledgement message is initiated and is used by the automated call acknowledgement service to generate an acknowledgement message.

Figure 3:
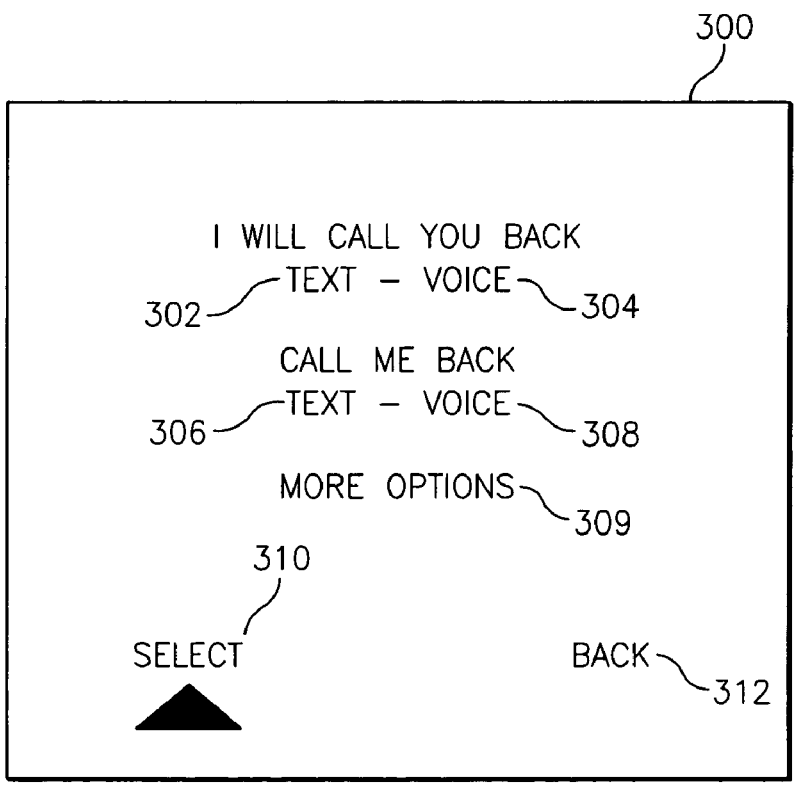
FIG. 3 is a sample screen display on a call-receiving device illustrating menu options available to a user of a call-receiving device that is implementing the automated call acknowledgement service in an exemplary embodiment.

FIG. 3 illustrates a sample screen display 300 of menu items displayed on a call-receiving device 110, 112 upon selecting the send message 208 option. The acknowledgement options on menu screen display 300 include pre-configured generic statements such as: "I will call you back" 302, 304 and "Call me back" 306, 308. Additional menu options may be configured via "more options" 309. The acknowledgement options 302-308 may represent an abbreviated version of the actual text message displayed to the calling party. For example, the "Call me back" option 306, 308 may translate on the calling party device as, "Hello, this is Bob. I saw that you called. I will call you back as soon as I am able."

To activate these options 302-309, the called party utilizing a keypad, stylus, mouse, or other input device, highlights the selection and enters "select" 310. Otherwise, the called party may go back to a previous screen by selecting "back" 312.

The automated call acknowledgement service allows a called party to send an acknowledgement message by voice or text. For example, a message type "I will call you back" text 302 refers to a selection in which the call receiving party wishes to send an acknowledgement message in text form to the calling party. A call-receiving party who is familiar with the calling party may be aware that the individual calling has access to a PDA or similar device and so may decide that sending a text acknowledgement message is preferable over the voice option. Likewise, a called party may select an acknowledgement message for transmission to the calling party in voice format. The menu screen of FIG. 3 reflects a sampling of the type of options that may be provided to a calling party. Embodiments of the automated call acknowledgement service contemplate other similar menu options as well as those depicted in FIG. 3. Embodiments may include a menu screen including additional sub-menu options that are presented in response to a selection of a message type. For example, when a user selects "I will call you back" voice 304, a sub-menu is displayed on the call-receiving device 110, 112 with a message "select a time for call back" followed by time-incremented choices available for selection. The resulting acknowledgement message would reflect that the call-receiving party has indicated an intent to call the calling party back in a specified number of minutes or other time frame.

As indicated above, when an incoming call is detected on a call-receiving device 110, 112, the party receiving the call has three options: to answer the call, ignore the call, or send an acknowledgement message. FIG. 4 describes the implementation of the automated call acknowledgement service when the call-receiving party has selected the "send message" 208 option. The call-receiving party selects one of several options 302-309 as described in FIG. 3. At step 402, the automated call acknowledgement service receives a data request for an acknowledgement message from the call-receiving device. The data request is automatically created by the automated call acknowledgement service and contains the phone number or text address of the calling party (depending upon which mode the calling party used to place the call), the phone number or of the call-receiving party, and the message type in accordance with the option 302-309 selected by the call-receiving party (e.g., "I will call you back" and "call me back"). This information is readily available to the automated call acknowledgement service using existing communications technology. The data request also contains a voice/text indicator, provided by the call-receiving party via options 302-309, that lets the automated call acknowledgement service know how to transmit the acknowledgement message.

If the text/voice indicator specifies "text" at step 404, the automated call acknowledgement service looks at the calling party information in the data request to determine whether the call originated from a phone or computer device. If the call came from a phone, the automated call acknowledgement service searches calling party customer profile database 118 at step 408 by mapping the calling party number in the data request to an associated text address stored in database 118. The text address is entered into the data request at step 410. The automated call acknowledgement service retrieves the actual text of the selected acknowledgement message from called customer profile database 119 at step 412 by mapping the message type selected to the associated acknowledgement message text stored in called customer profile database 119. Step 412 is likewise performed if it is determined that the call originated from a text-based calling device at step 406. This resulting acknowledgement message text is formatted using existing transmissions protocols and sent in text form to the calling device at step 414.

If, on the other hand, the text/voice indicator specifies "voice" at step 404, the automated call acknowledgement service creates a call request for a voice acknowledgement message at step 416. The call request may be a simple data packet and includes a field for a delay period that may be set by default or user-customized. The delay is used to prevent premature placing of the call during a time when the calling party has not yet disconnected the call placed to call-receiving device. This might occur, for example, when the calling party is leaving a voicemail message. The call request is automatically populated with information from the data request such as calling device phone number and call-receiving device phone number at step 418. At step 420, the automated call acknowledgement service determines whether the call originated from a phone or text device by looking at the information in the data request. If the call originated from a text device, the automated call acknowledgement service searches the calling customer profile database 118 at step 422 in order to find an associated phone number for the text address. Once found, the phone number is entered into the call request at step 424. At step 426, the automated call acknowledgement service searches called customer profile database 118 for the actual acknowledgement message text associated with the acknowledgement message type selected by the call-receiving party and enters this acknowledgement message into the call request. The call request is then sent to voice XML gateway 128 at step 428 and the message is converted from text to speech at step 430. The automated call acknowledgement service then places a call to the calling party device at step 432 and the voice acknowledgement message is presented to the calling party device.

It will be understood that some of the data and functionality of the automated call acknowledgement service may be stored internally on calling devices and call-receiving devices with resident memory.

The automated call acknowledgement service provides a convenient way to acknowledge to a caller that the called party is aware of the call and to communicate information as to how or when the two parties may communicate at a future time without physically answering the call. The automated call acknowledgement service is optimally implemented in situations where the caller is not able to answer the call and has no other option but to let the call pass.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing automated call acknowledgement services over a communications network, comprising:
    storing addresses including a phone number and a text address for a calling device in a database;
    mapping the phone number for the calling device to the text address of the calling device in the database;
    receiving a data request from a call-receiving device to acknowledge an incoming call from the calling device, the data request including a pre-defined acknowledgement message type, one of the addresses identified with the incoming call, and a mode of transmitting a pre-defined acknowledge message selected by the call-receiving device;
    determining a communication mode of the incoming call, the communication mode being one of a voice communication and a data communication;

comparing the communication mode of the incoming call with the mode selected for transmitting the pre-defined acknowledge message by the call-receiving device;

if the communication mode of the incoming call does not match the mode selected for the pre-defined acknowledge message, retrieving an address from the database that is mapped to an address identified in the communication mode of the incoming call, and which also conforms to the communication mode selected by the call-receiving device;

retrieving a pre-defined acknowledgement message from a database, the pre-defined acknowledgement message corresponding to the pre-defined acknowledgement message type;

formatting the pre-defined acknowledge message to include one of: the address identified in the incoming call when the communication mode of the incoming call matches the selected mode of transmitting the pre-defined acknowledgement message selected by the call-receiving device, and the address retrieved from the database when the communication mode of the incoming call does not match the selected mode of transmitting the pre-defined acknowledgement message selected by the call-receiving device;

sending the pre-defined acknowledgement message to the calling device via the address corresponding to the selected mode of transmission; and sending the incoming call to a voicemail system of the call-receiving device;

wherein the sending an acknowledgement message to the calling device is implemented in lieu of answering the incoming call.

2. The method of claim 1, wherein the selected mode of transmission is a data communication, and sending the pre-defined acknowledgement message includes transmitting the pre-defined acknowledgement message in text form.

3. The method of claim 1, wherein the selected mode of transmission is a voice communication, and sending the pre-defined acknowledgement message includes transmitting the pre-defined acknowledgement message in voice form.

4. The method of claim 1, wherein the pre-defined acknowledgement message is created by a user of the automated call acknowledgement services.

5. The method of claim 3, further comprising creating a call request, the call request including:
a phone number for the calling device;
a phone number for the call-receiving device; and
the pre-defined acknowledgement message converted into voice format.

6. The method of claim 1, further comprising:
storing the message type;
storing the pre-defined acknowledgement message; and
mapping the message type to the pre-defined acknowledgement message operable for linking pre-defined acknowledgement messages to message types displayed on the call-receiving device and retrieving associated pre-defined acknowledgement messages from storage for transmission to the calling device.

7. The method of claim 1, wherein the data request includes:
a phone number for the call-receiving device;
at least one of a phone number and text address for the calling device; and
a voice/text indicator selection representing the selected mode of transmitting the pre-defined acknowledgement message.

8. A system for providing automated call acknowledgement services over a communications network, comprising:
a computer processor device; and
an automated call acknowledgement service executing on the computer processor device, the automated call acknowledgement service in communication with a call-receiving device and a calling device, the automated call acknowledgement service implementing:

storing addresses including a phone number and a text address for a calling device in a database;

mapping the phone number for the calling device to the text address of the calling device in the database;

receiving a data request from a call-receiving device to acknowledge an incoming call from the calling device, the data request including a pre-defined acknowledgement message type, one of the addresses identified with the incoming call, and a mode of transmitting a pre-defined acknowledge message selected by the call-receiving device;

determining a communication mode of the incoming call, the communication mode being one of a voice communication and a data communication;

comparing the communication mode of the incoming call with the mode selected for transmitting the pre-defined acknowledge message by the call-receiving device;

if the communication mode of the incoming call does not match the mode selected for the pre-defined acknowledge message, retrieving an address from the database that is mapped to an address identified in the communication mode of the incoming call, and which also conforms to the communication mode selected by the call-receiving device;

retrieving a pre-defined acknowledgement message from a database, the pre-defined acknowledgement message corresponding to the pre-defined acknowledgement message type;

formatting the pre-defined acknowledge message to include one of: the address identified in the incoming call when the communication mode of the incoming call matches the selected mode of transmitting the pre-defined acknowledgement message selected by the call-receiving device, and the address retrieved from the database when the communication mode of the incoming call does not match the selected mode of transmitting the pre-defined acknowledgement message selected by the call-receiving device;

sending the pre-defined acknowledgement message to the calling device via the address corresponding to the selected mode of transmission; and sending the incoming call to a voicemail system of the call-receiving device;

wherein the sending an acknowledgement message to the calling device is implemented in lieu of answering the incoming call;

wherein the call request includes a delay field operable for preventing premature transmission of the pre-defined acknowledgement message to the calling device to allow time for a caller of the calling device to complete a voicemail message at the voicemail system of the call-receiving device.

9. The system of claim 8, wherein the selected mode of transmission is a data communication, and sending the pre-defined acknowledgement message includes transmitting the pre-defined acknowledgement message in text form.

10. The system of claim 8, wherein the selected mode of transmission is a voice communication, and sending the pre-defined acknowledgement message includes transmitting the pre-defined acknowledgement message in voice form.

11. The system of claim 8, wherein the pre-defined acknowledgement message is created by a user of the automated call acknowledgement.

12. The system of claim 10, wherein the automated call acknowledgement service further implements creating a call request, the call request including:
   a phone number for the calling device;
   a phone number for the call-receiving device; and
   the pre-defined acknowledgement message converted into voice format.

13. The system of claim 12, wherein the automated call acknowledgement service further implements:
   storing the message type;
   storing the pre-defined acknowledgement message; and
   mapping the message type to the pre-defined acknowledgement message operable for linking pre-defined acknowledgement messages to message types displayed on the call-receiving device and retrieving associated pre-defined acknowledgement messages from storage for transmission to the calling device.

14. The system of claim 8, wherein the data request includes:
   a phone number for the call-receiving device;
   at least one of a phone number and text address for the calling device; and
   a voice/text indicator selection representing the selected mode of transmitting the pre-defined acknowledgement message.

15. A storage medium encoded with machine-readable computer program code for providing automated call acknowledgement services over a communications network, the storage medium including instructions for causing a computer to implement a method, comprising:
   storing addresses including a phone number and a text address for a calling device in a database;
   mapping the phone number for the calling device to the text address of the calling device in the database;
   receiving a data request from a call-receiving device to acknowledge an incoming call from the calling device, the data request including a pre-defined acknowledgement message type, one of the addresses identified with the incoming call, and a mode of transmitting a pre-defined acknowledge message selected by the call-receiving device;
   determining a communication mode of the incoming call, the communication mode being one of a voice communication and a data communication;
   comparing the communication mode of the incoming call with the mode selected for transmitting the pre-defined acknowledge message by the call-receiving device;
   if the communication mode of the incoming call does not match the mode selected for the pre-defined acknowledge message, retrieving an address from the database that is mapped to an address identified in the communication mode of the incoming call, and which also conforms to the communication mode selected by the call-receiving device;
   retrieving a pre-defined acknowledgement message from a database, the pre-defined acknowledgement message corresponding to the pre-defined acknowledgement message type;
   formatting the pre-defined acknowledge message to include one of: the address identified in the incoming call when the communication mode of the incoming call matches the selected mode of transmitting the pre-defined acknowledgement message selected by the call-receiving device, and the address retrieved from the database when the communication mode of the incoming call does not match the selected mode of transmitting the pre-defined acknowledgement message selected by the call-receiving device;
   sending the pre-defined acknowledgement message to the calling device via the address corresponding to the selected mode of transmission; and
   sending the incoming call to a voicemail system of the call-receiving device;
   wherein the sending an acknowledgement message to the calling device is implemented in lieu of answering the incoming call.

16. The storage medium of claim 15, wherein the selected mode of transmission is a data communication, and sending the pre-defined acknowledgement message includes transmitting the pre-defined acknowledgement message in text form.

17. The storage medium of claim 15, wherein the selected mode of transmission is a voice communication, and sending the pre-defined acknowledgement message includes transmitting the pre-defined acknowledgement message in voice form.

18. The storage medium of claim 15, wherein the pre-defined acknowledgement message is created by a user of the automated call acknowledgement services.

19. The storage medium of claim 17, further comprising instructions for causing the computer to create a call request, the call request including:
   a phone number for the calling device;
   a phone number for the call-receiving device; and
   the pre-defined acknowledgement message converted into voice format.

20. The storage medium of claim 15, further comprising instructions for causing the computer to implement:
   storing the message type;
   storing the pre-defined acknowledgement message; and
   mapping the message type to the pre-defined acknowledgement message operable for linking pre-defined acknowledgement messages to message types displayed on the call-receiving device and retrieving associated pre-defined acknowledgement messages from storage for transmission to the calling device.

21. The storage medium of claim 15, wherein the data request includes:
   a phone number for the call-receiving device;
   at least one of a phone number and text address for the calling device; and
   a voice/text indicator selection representing the selected mode of transmitting the pre-defined acknowledgement message.

* * * * *